TECHNIQUE FOR ENHANCING THE STABILITY OF TRANSITION METAL-GOLD THIN FILM COMPOSITES

Filed April 6, 1970

LEGEND:

● BURNISHED

○ UNBURNISHED

INVENTORS: A. T. ENGLISH
P. A. TURNER

BY Edward M. Fink

ATTORNEY

United States Patent Office 3,676,214

Patented July 11, 1972

3,676,214
TECHNIQUE FOR ENHANCING THE STABILITY OF TRANSITION METAL-GOLD THIN FILM COMPOSITES

Alan Taylour English, Summit, and Paul Anthony Turner, Murray Hill, N.J., assignors to Bell Telephone Laboratories, Incorporated, Murray Hill, N.J.

Filed Apr. 6, 1970, Ser. No. 25,923
Int. Cl. B44d *1/14*
U.S. Cl. 117—217 4 Claims

ABSTRACT OF THE DISCLOSURE

A technique is described for obviating thermal degradation of adhesion of transition metal-gold thin film composites by effecting occlusion of pin holes in the gold film. This end is attained by mechanical procedures which take advantage of the malleable nature of the gold.

BACKGROUND OF THE INVENTION

(1) Field of the invention

This invention relates to a technique for reducing the adhesion degradation of thin film components. More particularly, the present invention relates to a technique for reducing the thermal degradation of adhesion of transition metal-gold conductive components.

(2) Description of the prior art

In recent years miniaturization of components and circuitry coupled with the increasing complexity of modern electronic systems have created an unprecedented demand for reliability in thin film circuitry and the need for the total exploitation of the technology. This is particularly true in the case of lead attachment which has long been recognized as being a critical factor in the stability of circuit characteristics.

Early workers in the art recognized that the metallurgical compatibility of the various metallic constituents of the joining and conducting system played a permanent role in determining the parameters of interest, so motivating the use of a single metal for this purpose, Although such systems were found to be ideal from a metallurgical standpoint, they suffered from inherent defects in that the manufacturer was necessarily restricted from the standpoint of obtaining optimum circuit characteristics. Accordingly, the interest of workers in the art was focused upon multi-metal joining or conducting systems.

Unfortunately, studies have revealed that thermal degradation of adhesion of gold-transition metal thin film composites often occurred, such degradation having initially been attributed to diffusion and migration effects. In order to obviate this limitation, workers in the art proposed inserting a barrier, typically comprising platinum or palladium between the gold and the other member of the composite of interest. Although such attempts were found to be successful, continued investigation has been carried out by workers in the art with a view toward more fully comprehending the mechanistic aspects of such degradation.

SUMMARY OF THE INVENTION

In accordance with the present invention, a novel technique is described for obviating thermal degradation of adhesion of metallized-gold thin film composites by effecting occlusion of pinholes in the gold film. It has now been discovered that the prior art problems delineated above with respect to adhesion degradation are not caused by interdiffusion effects but are in fact caused by electrochemical processes. More specifically, it has been discovered that thermal degradation of adhesion of gold-metal composite films is due to corrosion by environmental species of the active metal or transition metal layer, access to which is gained by means of pinholes in an overlying gold layer, such pinholes being passages which directly connect one side of a thin film with the other side. The inventive technique involves the elimination, by way of occlusion, of the pinholes in the gold film, such end being attained by mechanical procedures which take advantage of the malleable nature of the gold.

BRIEF DESCRIPTION OF THE DRAWING

The invention will be more readily understood by reference to the following more detailed description taken in conjunction with the accompanying drawing, wherein.

DETAILED DESCRIPTION

Figure 1:
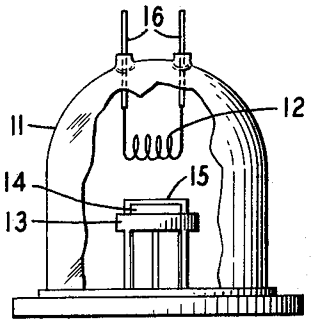
FIG. 1 is a front elevational view of an apparatus suitable for use in producing a film of metal by vacuum evaporation techniques pursuant to the practice of the present invention.

With reference now more particularly to the drawing, FIG. 1 shows a suitable vacuum evaporation apparatus for depositing thin films in accordance with the invention. Shown in FIG. 1 is a vacuum chamber 11 containing filament 12 and platform 13 which latter is employed as a positioning support for substrate 14. Mask 15 is utilized as shown to restrict the deposition of the film to the desired area. The ends of filament 12 are connected to electrical leads 16 to permit flow of current therethrough from a source, not shown. The apparatus also includes an inlet 17 for the introduction of gas during the processing and an outlet 18 for removal of gas, outlet 18 being connected to a suitable pump, not shown.

The present invention has been described largely in terms of the deposition of gold-titanium composites. However, it will be appreciated that such description is solely for purposes of exposition and that any metal capable of being deposited in thin film form by vacuum evaporation techniques may be obtained in the described manner. Metals found to be particularly useful for thin film application are amenable to such processing and include aluminum, copper, nickel, iron, et cetera.

The invention may conveniently be described by reference to an illustrative embodiment wherein gold and titanium are employed as the metals of the composite. An apparatus similar to that shown in FIG. 1 may conveniently be employed for the purpose of effecting deposition of the films.

The conditions employed in the vacuum evaporation process are well known (see Vacuum Deposition of Thin Films, L. Holland, John Wiley and Sons, Inc., New York, 1956). The extent of the vacuum is dictated by consideration of the vapor pressure of the metal to be evaporated. In conventional vacuum evaporation processes it is generally considered that the vapor pressure of the metal to be evaporated should be at least ten times greater than the pressure to which the system is evacuated. In general, better quality films are obtained at higher vacuum. When using metals with relatively high vapor pressure, the maximum pressure which can be tolerated is that above which the oxygen present interferes with the deposition of a pure metallic film.

The usual method of heating the metal to be evaporated is to position it in proximity to a filament which may be heated electrically. This end is conveniently accomplished by using a tungsten filament in the shape of a coil as shown in FIG. 1, and placing the metal to be evaporated within the coil. The required temperature is obtained by controlling the magnitude of the current flowing through the filament. Alternatively, a filament of the metal to be evaporated may be used in those instances where the metal has a sufficiently high metal pressure at temperatures below its melting point.

It will be understood by those skilled in the art that the substrate member upon which deposition is to be effected, as described, may be selected from among glass, unglazed ceramics, glazed ceramics, high melting metals and any thin film circuitry requiring the deposition of a metal composite thereon.

The substrate member is typically cleaned for the purpose of removing contaminants therefrom, any well-known cleansing technique being suitable for this purpose. Substrate 14 is then placed upon platform 13 and mask 15 suitably positioned. Next, vacuum chamber 11 is evacuated to a pressure of the order of $10^{-6}$ torr.

After the prerequisite pressure is obtained, a current is passed through tungsten filament 12, thereby heating the filament and causing the metal of interest to evaporate. Evaporation is continued for a time period sufficient to produce a thin film of the desired thickness. Thereafter, gold is deposited in the foregoing manner upon the film so produced. The thickness of the initially deposited layer is of no criticality and it is solely dependent upon the specific role that the metal composite is to play in the resultant circuitry. The thickness of the subsequently deposited gold is similarly dependent on the intended use. However, in the practice of this invention, the gold thickness should generally exceed some (experimentally-determined) minimum value so as to optimize the effectiveness of the mechanical procedures for pinhole occlusion which follow. The thickness of the gold is normally greater in cases where the substrate exhibits larger surface roughness, and smaller in cases where relatively smooth substrates are employed.

Following the deposition of the thin film composite, occlusion of pinholes contained within the gold layer is effected by mechancial techniques which take advantage of the malleable character of the gold and which are capable of effecting the movement of gold from adjacent areas into the pinholes. Among the specific mechanical techniques are several which are well known, including wire brushing, sand blasting, honing, barrel finishing, vibratory ball burnishing, et cetera. The selection of a particular mechanical procedure will be dependent upon the specific composite produced and by practical considerations relating to the availability of equipment. However, experimentation has shown the most effective procedure to be vibratory ball burnishing.

"Burnishing is [a process] used to produce smooth, glazed and mirror-like surfaces on metal parts. True burnishing of soft, malleable metals employs a medium consisting of steel balls or other highly polished steel shapes; the metal surface is not abraded but is compressed and planished by the action of the medium." (ASM Metals Handbook, vol. 2, page 389, American Society for Metals, Metals Pack, Ohio, 1964.) The planishing action leads inevitably to occlusion of pinholes, subject only to the aforementioned requirement that the gold thickness be adequate in relation to surface roughness.

In the vibratory ball burnishing process, the mechanism of pinhole occlusion involves metal movement associated with the planishing action of the balls on the film surface. The operation of the mechanism requires that the balls make contact with every portion of the film surface at some time during the operation. In light of the fact that any surface shape can be analyzed into a sum of sinusoidal components by Fourier analysis, the satisfaction of the geometrical conditions necessary to produce burnishing by this procedure can be readily calculated.

The rate of ball burnishing is determined primarily by choice of frequency, amplitude and the mode of vibration of the container holding the balls and work pieces, and by the number of balls, their size and density.

The balls chosen for use herein are required to manifest (a) high density, (b) high mechanical strength, (c) high elastic modulus, and (d) smooth surfaces. The use of low density materials produces little metal movement, whereas the use of materials of low elastic modulus results in the storing of impact energy in the ball rather than its being transferred to the film. Similarly, if yield strength is too low, the balls rather than the film will be deformed. It has been found that hardened, polished steel is most satisfactory in this use because of its availability, high density and elastic modulus.

Ball size ranges from $\frac{1}{10}$ millimeter to one centimeter in diameter, an optimum being found to occur at approximately one millimeter. The use of balls having diameters less than the noted minimum fails to produce metal movement, whereas exceeding the noted maximum tends to result in substrate damage.

The number of balls employed may range between 0.5 and 10 layers in the container, an optimum being found to occur with two layers. Failure to employ the noted minimum number of layers will not result in burnishing except after excessively long time periods, whereas the use of greater than ten layers fails to result in agitation at the bottom of the container due to the weight of the overlying layers.

The mode of agitation may be up and down or lateral cyclic in nature wherein the sample remains in the bottom of the container under a thin layer of balls.

Another alternative for effecting metal movement and occlusion of pinholes involves wire brushing in which the desired end is attained by the controlled pressure of rapidly moving wire or natural bristle tips on the film surface. This technique requires high brush speeds, fine bristles and gentle pressure.

The brush material selected may comprise any metal or alloy of relatively high strength as compared to the film. It is desirable to employ bristles ranging in diameter from 0.1 to 10 mils, the limits being dictated by practical considerations. The speed of the bristle tip is desirably maintained within the range of 200–5000 inches per second, an optimum being found to exist at 1000 inches per second. This range is dictated by considerations relating to ease of control and the desire for rapid pinhole occlusion.

Examples of the present invention are described in detail below. The examples and the foregoing illustration are included merely to aid in the understanding of the invention and variations may be made by one skilled in the art without departing from the spirit and scope of the invention.

EXAMPLE I

This example describes the preparation of a thin film composite comprising gold and titanium upon diverse alumina substrates. The alumina substrates selected were an American Lava 96% alumina, American Lava 99.5% alumina, and an alumina substrate developed by the Western Electric Company termed "Superstrate." Each of the substrates selected was heated to 900° C. for one hour in air and then metallized by filament evaporation in an apparatus similar to that shown in FIG. 1 with 500 A. of titanium followed by either 5000 A., 10,000 A., 20,000 A. or 40,000 A. of gold. Samples of each type from each substrate load were placed face-up in a Fisher vibrating-type metallographic polishing machine. A quantity of $\frac{1}{16}$" diameter polished steel balls sufficient to make two layers of balls were added to the machine and vibration initiated.

During the burnishing process the samples were removed from the apparatus and their flatness evaluated in terms of the intensity of light specularly reflected from a normally incident monochromatic beam. The reflected intensity was then instrumentally compared to the incident intensity and their ratio autographically plotted as a function of time while the sample was translated before the incident light beam. The average value was estimated graphically and these values of normal reflectivity were divided by the normal reflectivity of a specular gold mirror made by evaporating gold upon a glass substrate. The resulting parameter R is the relative normal reflectivity of the sample expressed as a percentage.

Figure 2:
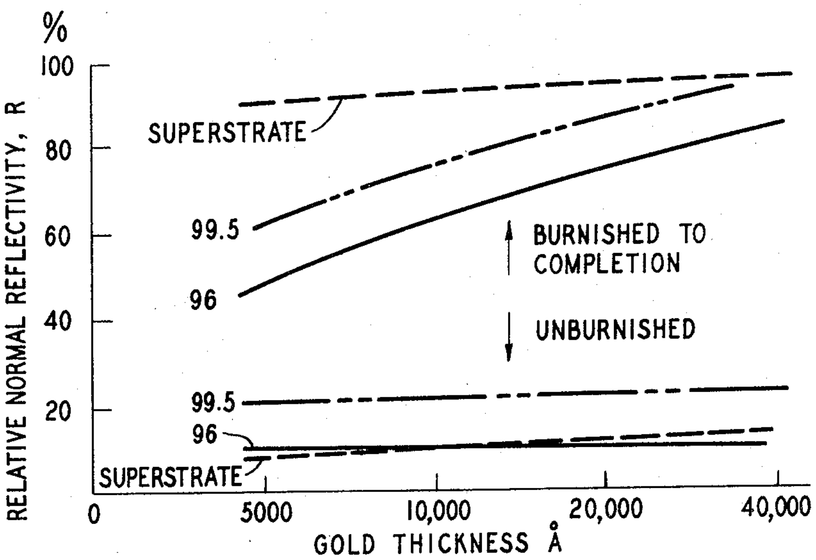
FIG. 2 is a graphical representation on coordinates of gold thickness in angstroms against relatively normal reflectivity in percent showing surface smoothness characteristics for metallized gold composites treated in accordance with the invention and prior art untreated composites.

With reference now to FIG. 2 there is shown a graphical representation on coordinates of gold thickness against relative normal reflectivity in percent showing the effect of burnishing in accordance with the present invention. For comparative purposes, similar results are shown for unburnished composites prepared in accordance with the procedure set forth above. As evidenced by FIG. 2, the burnished samples manifest a much higher level of reflectivity than the unburnished samples, so indicating a redistribution of metal upon the surface sufficiently extensive as to assure that substantial occlusion of pinholes in the gold layer has taken place.

Figure 3:
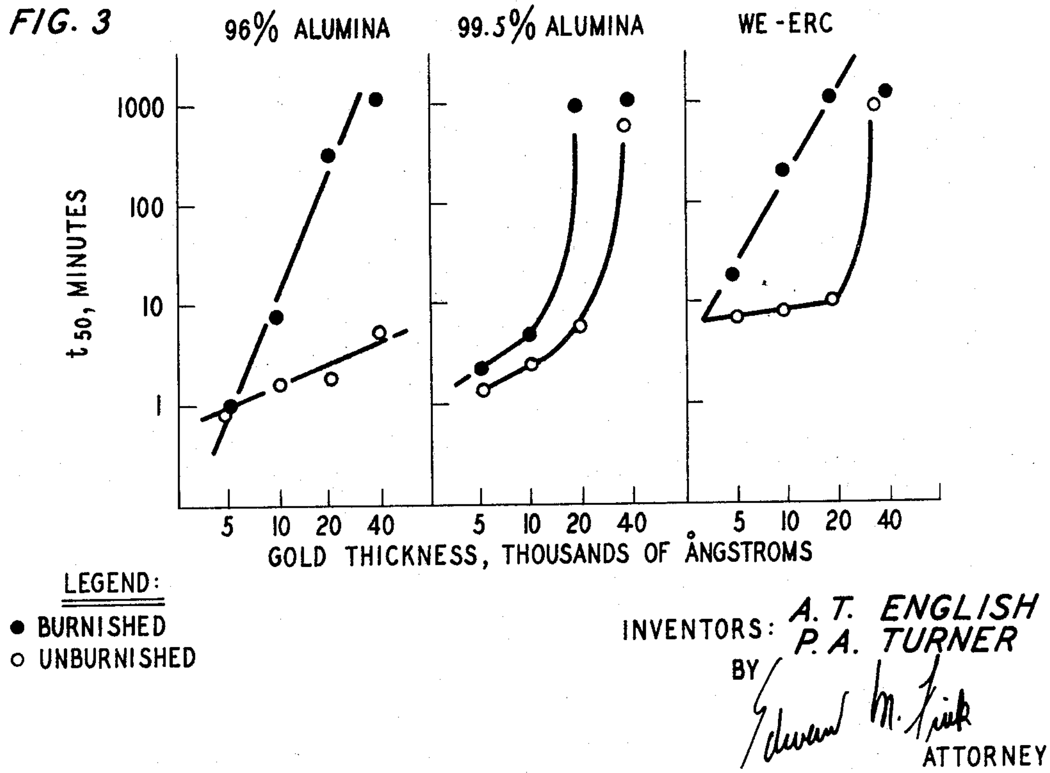
FIG. 3 is a graphical representation on coordinates of gold thickness in angstroms against acid immersion time in minutes required to produce 50% stripping in a pressure sensitive tape test which shows the corrosion resistance characteristics of composites of the invention and those of the prior art.

After burnishing was complete, the resistance to corrosion and thus the extent of pinhole occlusion was evaluated by immersion of the samples in a 5% aqueous hydrogen fluoride solution, such solution rapidly dissolving titanium. By utilizing a plurality of samples, it was possible to determine the immersion time after which 50% of the film area was removed in a subsequent scotch tape peel test. The acid immersion time required to produce such stripping was designated $t_{50}$ and was plotted in FIG. 3 as a function of initial gold thickness for unburnished samples and for samples burnished for about one hour. Although the increase in acid immersion time $t_{50}$ after burnishing is rather modest for 5000 A. and 10,000 A. gold films, it amounts to at least two orders of magnitude for 20,000 A. of gold and none of the burnished samples with 40,000 A. of gold could be stripped after 1000 minutes acid immersion, so proving invulnerability to pinhole corrosion of any type. It is noted that the unburnished samples are subject to corrosion significantly faster than the burnished samples.

EXAMPLE II

A 99.5% alumina substrate having a 1000 A. layer of titanium and a 15,000 A. layer of gold deposited thereon was subjected to wire brushing utilizing a rotary wire bristle brush driven at approximately 30,000 revolutions per minute. Around the circumference of the shaft mounted 1/4" diameter hub were a large number of radially directed 0.4" in length wire bristles of 0.003" diameter steel. The rotating brush was brought manually into gentle contact with the film.

The sample so treated was immersed in a 5% aqueous solution of hydrogen fluoride for a time period of approximately one hour and then subjected to a pressure sensitive tape peel test. The metallization was removed from the substrate only in those areas which had not been subjected to the wire brushing, so indicating an improvement in adhesion of the gold layer to the substrate via the mechanism of pinhole occlusion.

We claim:

1. A technique for reducing thermal degradation of adhesion of gold-transition metal thin film composites which comprises the steps of successively depositing a layer of a transition metal and a layer of gold on a substrate and subsequently effecting occulsion of pinholes in the gold layer by mechanically moving gold from adjacent areas into said pinholes.

2. A technique in accordance with claim 1 wherein said transition metal is titanium.

3. A technique in accordance with claim 1 wherein mechanical movement of gold is effected by vibratory ball burnishing.

4. A technique in accordance with claim 1 wherein mechanical movement of gold is effected by wire brushing.

References Cited

UNITED STATES PATENTS

| | | | |
|---|---|---|---|
| 1,909,586 | 5/1933 | Kramer | 29—90 |
| 1,915,817 | 6/1933 | Dahlberg | 29—90 |
| 2,484,540 | 10/1949 | Whitehouse | 29—90 |
| 2,799,600 | 7/1957 | Scott | 117—71 R X |
| 3,523,223 | 8/1970 | Luxem et al. | 317—234 M UX |

OTHER REFERENCES

Metals Handbook; Novelty, Ohio; American Society for Metals, 1948, pp. 303, 304, 1109.

ALFRED L. LEAVITT, Primary Examiner

C. K. WEIFFENBACH, Assistant Examiner

U.S. Cl. X.R.

29—90; 117—64, 71 R, 109; 317—234 M